Figure 1:
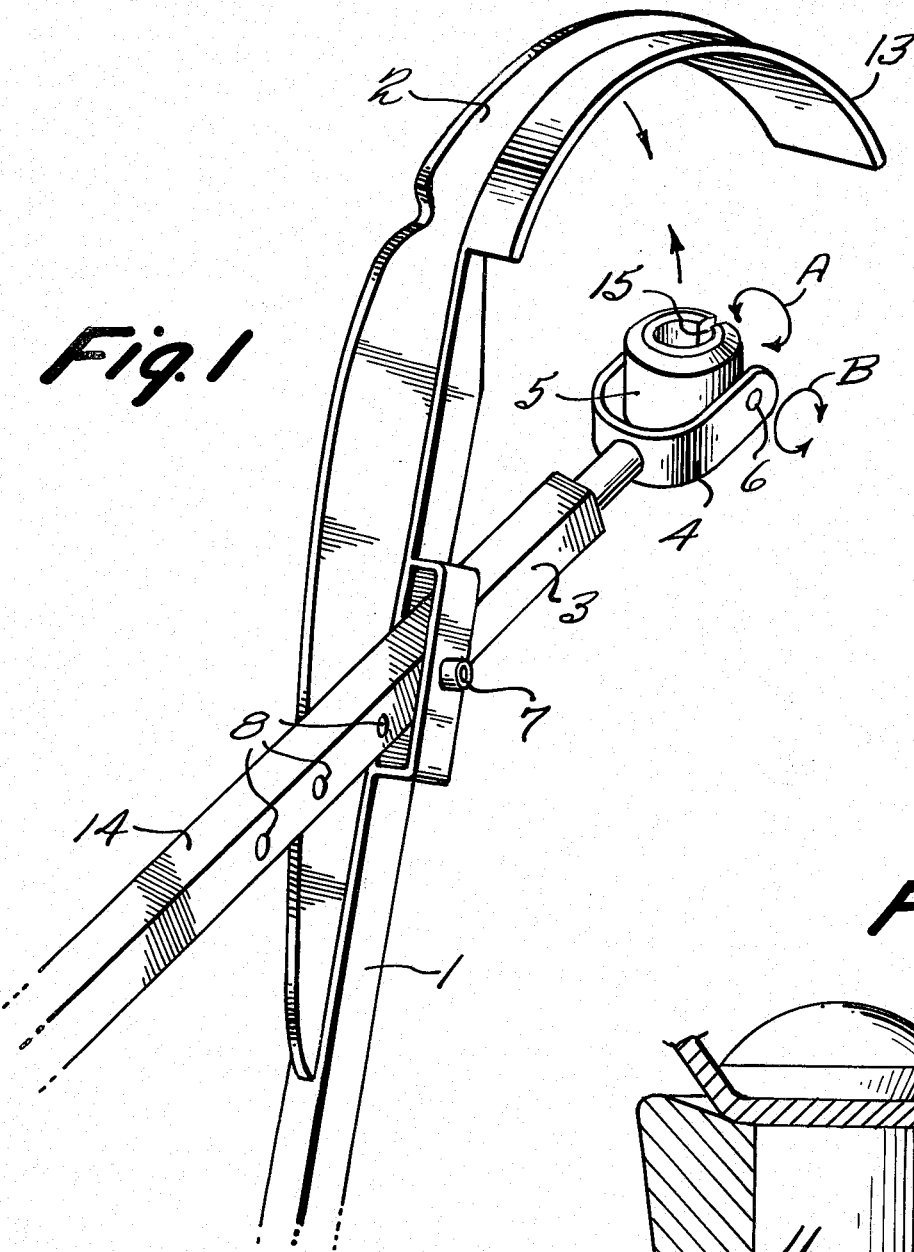

United States Patent [19]
Schmidt

[11] 3,882,586
[45] May 13, 1975

[54] TOOL FOR FASTENING COMPENSATING WEIGHTS TO SPOKED WHEELS

[75] Inventor: Gunter Schmidt, Darmstadt, Germany

[73] Assignee: Gebr. Hofmann KG, Darmstadt, Germany

[22] Filed: Mar. 19, 1974

[21] Appl. No.: 452,673

[30] Foreign Application Priority Data
Aug. 14, 1973 Germany.............................. 2341116

[52] U.S. Cl. ................... 29/268; 81/425 A; 81/426
[51] Int. Cl. ............................................ B25b 27/02
[58] Field of Search ......... 29/200 H, 238, 248, 268, 29/267; 81/5.1 R, 418, 424, 425 R, 425 A, 426

[56] References Cited
UNITED STATES PATENTS
1,389,406   8/1921   Williams ............................. 29/248

FOREIGN PATENTS OR APPLICATIONS
791,498   12/1935   France ................................ 29/248
78,027   12/1918   Netherlands .......................... 81/5.1

Primary Examiner—Al Lawrence Smith
Assistant Examiner—Harold P. Smith, Jr.
Attorney, Agent, or Firm—Cushman, Darby & Cushman

[57] ABSTRACT

A tool for fastening compensating weights to spoked wheels having a pair of tong legs with one leg having a wheel engaging surface and the other leg pivotably connected to the first and a weight receiving member pivotably attached to the second leg opposite the engaging surface. The member has a compensating weight receiving tapered and slotted bore into which a weight compensating element can be placed.

7 Claims, 2 Drawing Figures

TOOL FOR FASTENING COMPENSATING WEIGHTS TO SPOKED WHEELS

This invention relates to a tool for fastening compensating weights to spoked wheels, in particular to motorcycle wheels.

As is known, the balancing of motorcycle wheels is highly important for the operation of the motorcycle. An unbalance in the tire affects in the first instance the service life of the tire. An unbalance can, however, also be very annoying as regards the steering of the motorcycle, if within certain speed ranges heavy vibrations vibrations occur, which do not only harass the driver, but also strain the individual components of the motorcycle unduly, causing premature wear.

It is known that the compensating weights adapted as described in the published German patent application No. B 21879, are mounted by hand on a spoke and subsequently fitted on the cylindrical portion of the spoke nipple by blows with a hammer or a similar tool. This impact may subject the weight to such a deformation that its adhesion is no longer sufficient so that it comes off as soon as the motorcycle is driven. In addition, there is the risk that under the effect of blows on one side, the weight will spall and thus become unserviceable.

It is the aim of the invention to represent a tool, avoiding the disadvantages mentioned hereinbefore, which renders possible pushing the compensating weights on the cylindrical portion of the spoke nipple in such a way that a uniform pressure is exerted on the compensating weight from all sides.

This object is achieved by the tool of the above-mentioned type according to the invention in that it has the shape of tongs, one leg of which is adapted as countersupport which is placed against the spoked wheel, and the other leg of which is provided with a receiving member with an opening into which the compensating weight is inserted, this opening being directed toward the tong leg serving as countersupport.

The tong leg adapted as countersupport is preferably arcuately shaped, with a flat cross section so that it lies against the tire. The member receiving the compensating weight, may be pivoted on an axis extending in parallel with the tong leg axis, and on another axis vertical to this first axis, so that the inclination of the receiving member may be adapted to the inclination of the spoke to which the compensating weight is attached. For this purpose the receiving member is preferably oriented between the two legs of a pivotal yoke forming a part of the tong leg. For rendering possible an adaptation of the tool to different wheel sizes, the distance between the receiving member and the fulcrum of the tongs is adjustable.

The tool according to the invention may be provided with two handles for manual control, but it may also be suitable for pneumatic or hydraulic operation.

When applying the compensating weight, the latter is pushed on the spoke and then inserted into the bore of the receiving member of the tool. The tong leg designed as countersupport, which can also be arched, as mentioned before, is resting against the tire tread. Now the compensating weight is pushed over the cylindrical portion of the spoke nipple at uniform pressure.

This will ensure that the compensating weight is firmly seated on the cylindrical portion of the spoke nipple without being subjected to an unsymmetrical deformation. Furthermore it is possible to exert a uniform pressure on the compensating weight while pushing it on the cylindrical portion of the spoke nipple.

Figure 2:
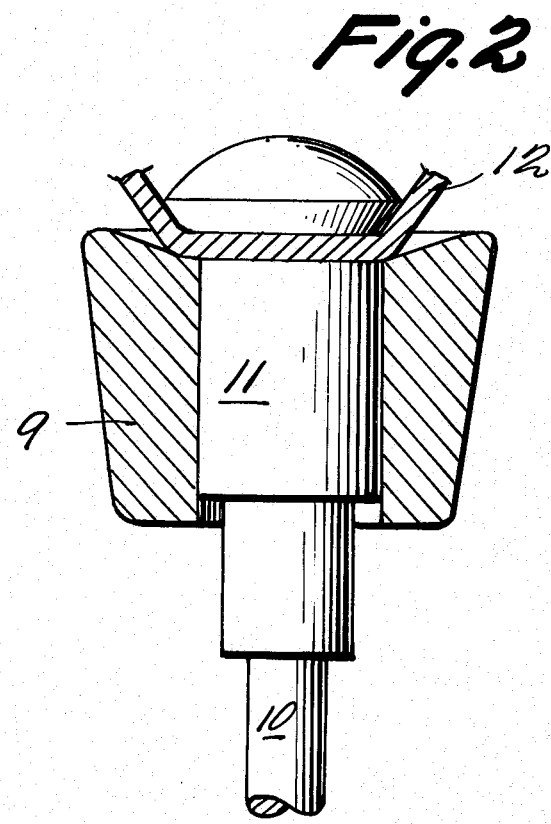

The invention will now be described by way of example, with reference to the accompanying drawings in which:

FIG. 1 is a perspective view of a tong-shaped tool according to the invention, and FIG. 2 is a schematic view of a compensating weight pushed over a spoke nipple.

In FIG. 1, tong leg 13 acts as counter-support when a compensating weight is fixed. Tong leg 13 is curved and therefore adapted to the profile of the mounted tire. For reinforcing the curved portion, a web 2 may be provided, which may, e.g. be welded on. The extremity of the other tong leg 3 is designed as pivotal yoke 4 in which a receiving member 5 is rotatable round a pivot so that the receiving member may pivot in two planes. The directions of pivot are indicated by the arrows A and B. The fulcrum of the two tong legs 3 and 13 is marked with a 7.

For adjusting the distance between receiving member 5 and fulcrum 7, additional boreholes 8 are provided in tong leg 3 so that any can be disposed at fulcrum 7. In leg 14, a handle (not illustrated) is joined to that leg to adjust the tool to different tire sizes. The other leg 1, which is the elongation of the tong leg 13, may also be fitted with a handle.

As in most cases, the spokes of motorcycle wheels are not attached to the wheel radially, but alternately, is an oblique position, yoke 4 is arranged pivotably so that it may adapt itself to the angle of skew of each spoke. Receiving member 5, too, is pivoted on the pin 6 as the spokes extend radially toward the rim and inwardly askew toward the wheel hub. As the receiving member 5 is tiltable, it may adjust itself to any working position.

During the mounting procedure, a compensating weight 9, shown in FIG. 2, is pushed over spoke 10. The tongs shown in FIG. 2 are brought into working position after the compensating weight 9 has been inserted into the bore, more specifically into the tapered bore, of the receiving piece 5. The spoke is passed through a slot 15 in the receiving member 5. Then the two tong legs 3 and 13 are moved in relation to each other so that the weight 9 is pushed over and pressed on the cylindrical portion of a spoke nipple 11 until the upper edge of the weight 9 abuts against rim flange 12.

The tongs may be operated by pressing together the two legs with handles 1 and 14, either manually or by pneumatic or hydraulic means. With the tool according to the invention, a rapid and safe application of the compensating weight is feasible. Many changes and modifications of the above-described embodiment of the invention are possible without departing from the scope thereof. Accordingly, that scope is intended to be limited only by the scope of the appended claims.

What is claimed is:

1. A tool for fastening compensating weights to spoked wheels comprising:
    a first tong leg having an extended region for engaging the peripheral surface of a spoked wheel,
    a second tong leg pivotably connected to said first leg, and
    a weight receiving member connected to said second leg and having a bore extending therethrough for receiving a weight compensating element, said bore being opposite said engaging region of said first tong, said member being pivoted about a first axis extending along the direction of said second leg and a second axis extending transversely to said first axis.

2. A tool as in claim 1 wherein said engaging region has an arcuate shape with a flat cross section.

3. A tool as in claim 1 wherein said second leg ends in a Y-shaped pivotable yoke having two legs and wherein said member is mounted between said yoke legs.

4. A tool as in claim 1 wherein said member has at least one lateral slot extending inwardly toward said bore.

5. A tool as in claim 1 wherein said bore is tapered.

6. A tool as in claim 1 wherein one of said legs includes a plurality of pivot points for adjusting the fulcrum of said tong legs.

7. A tool as in claim 1 further including a reinforcing web extending along said first tong leg.

* * * * *